(12) United States Patent
Yeh

(10) Patent No.: US 6,702,621 B2
(45) Date of Patent: Mar. 9, 2004

(54) BATTERY CONNECTOR WITH DUAL COMPRESSION TERMINALS

(75) Inventor: Ryan Yeh, Chino Hills, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/150,846

(22) Filed: May 17, 2002

(65) Prior Publication Data

US 2003/0216070 A1 Nov. 20, 2003

(51) Int. Cl.[7] .............................................. H01R 33/00
(52) U.S. Cl. ..................................................... 439/660
(58) Field of Search ................................ 439/660, 701, 439/500, 736, 626, 630, 66, 862, 637, 885

(56) References Cited

U.S. PATENT DOCUMENTS 6,027,381 A * 2/2000 Lok .......................... 439/736
6,068,519 A * 5/2000 Lok .......................... 439/660
6,113,440 A * 9/2000 Fijten et al. ................ 439/862
6,132,265 A * 10/2000 Shih et al. .................. 439/885

* cited by examiner

*Primary Examiner*—Jean F. Duverne
(74) *Attorney, Agent, or Firm*—Wei Te Chung

(57) ABSTRACT

A battery connector (5) has an insulative housing (1), an elongate insulative insert (2) and a plurality of terminals (3) insert molded with the insert. The housing defines a plurality of passageways (101) receiving corresponding terminals and a bottom opening (16) transecting the passageways. The insert has a body portion (20) received in the opening and lock portions (21) formed on opposite ends of the body portion engaging with the housing. Each terminal has a contacting portion (31), a connection portion (33), a mounting portion (35) and two spring portions (32, 34). The mounting portion forms a bulge (350) thereon. One of the spring portions is shaped generally having a profile of three-fourth circle.

13 Claims, 5 Drawing Sheets

BATTERY CONNECTOR WITH DUAL COMPRESSION TERMINALS

CROSS-REFERENCE TO RELATED APPLICATION

This application is a co-pending application of patent applications with unknown serial numbers, respectively entitled "ELECTRICAL CONNECTOR WITH PIVOTABLE CONTACT" and "BATTERY CONNECTOR", invented by the same inventor, filed on the same date, and assigned to the same assignee of the present invention.

BACKGROUND OF THE INVENTION

1. Field of the Invention

The present invention generally relates to a battery connector, and more particularly to a battery connector having dual compression terminals.

2. Description of the Related Art

Portable electrical or electronic appliances normally use rechargeable batteries as power sources. The batteries have contact faces, which, when the batteries are inserted in the electrical or electronic appliances, engage with resilient contact elements of battery connectors in the electrical or electronic appliances. As those electrical or electronic appliances are becoming more and more compact, the battery connectors used therein have a reduced size, which results in that the terminals of these battery connectors have a reduced size accordingly. It is usually difficult for a small contact to have a good resilience.

Referring to. FIG. 6, U.S. Pat. No. 6,068,519 discloses an electrical connector 7 for a rechargeable battery. The electrical connector 7 has an elongate insulative base 71 with a plurality of terminals 72 fixed thereto and a cover 73. Each terminal 72 has a soldering portion 721, a connection portion 722 and a contacting portion 723. A bore 711 is defined in a top wall 713 of the insulative base 71. Two pairs of grooves 712 are respectively defined in opposite sides of a bottom wall 714 of the insulative base 71. The cover 73 has a top wall 736 and two side walls 730 depending downwardly from two lateral sides of the top wall 736. A plurality of slots 735 is defined in the top wall 736 for receiving the terminals 72. Two pairs of resilient arms 733 protrude downwardly from the top wall 736 into an interior space (not labeled) of the cover 73. A protrusion 732 is formed on a free end of each resilient arm 733 for engaging with a corresponding groove 712 of the insulative base 71. A pin 734 extends from the top wall 736 into the interior space of the cover 73 for being inserted into the bore 711 of the insulative base 71.

However, the formation of the two pairs of resilient arms 733 and the pin 734 formed on the cover 73 and the bore 711 defined in the insulative base 71 complicate the structure of the connector. The manufacturing process of the connector is further complicated and the production cost is increased, since the terminals are mounted on a printed circuit board (PCB, not shown) by tedious soldering.

U.S. Pat. No. 6,027,381 and U.S. patent application Ser. No. 10/037,350, assigned to the same assignee as the present invention, disclose related battery connectors. The terminals of the battery connectors are soldered to PCBs, whereby a simple manufacturing process and a low cost is not achievable. U.S. Pat. No. 5,746,626 and U.S. Pat. No. 6,113,440 disclose conventional battery connectors, each having terminals soldered to PCBs. The terminals of these conventional connectors, due to their configurations, do not have good resilience so that after a period of use of these connectors, the terminals thereof may be no longer resilient sufficiently to have a reliable engagement with the batteries.

Hence, an improved battery connector with simple structure and improved terminals is needed to overcome the foregoing-shortcomings.

BRIEF SUMMARY OF THE INVENTION

It is an object of this invention to provide a battery connector having a simple structure.

It is a further object of this invention to provide a battery connector having dual-compression terminals, so that the terminals can be electrically connected to a printed circuit board (PCB) on which the connector is mounted without soldering, and the terminals are resilient enough to undergo repeated stress for a long period without fatigue.

It is still an object of this invention to provide a battery connector with terminals firmly secured in a housing thereof.

A battery connector according to the present invention includes an insulative housing, an insert and a plurality of terminals insert molded with the insert. The housing has a front wall, side walls, a rear wall, a top wall and inner walls together defining a plurality of passageways therebetween. A plurality of grooves is defined in a lower portion of the rear wall, and a plurality of slots is defined in the top wall in communication with the passageways. A hole and a cutout are defined in each of the side walls. An opening is defined in a bottom of the housing transecting the passageways. The insert has a body portion and two lock portions formed respectively on opposite ends of the body portion for engaging with the housing. Each terminal has a contacting portion, a first spring portion, a connection portion, a second spring portion and a mounting portion. The contacting portion has a convexity and a free end portion. A pair of tabs is formed on opposite edges of the connection portion of each terminal. The second spring portion is shaped generally having a profile of three-fourth circle.

Other objects, advantages and novel features of the invention will become more apparent from the following detailed description of a preferred embodiment when taken in conjunction with the accompanying drawings.

DETAILED DESCRIPTION OF THE INVENTION

Figure 1:
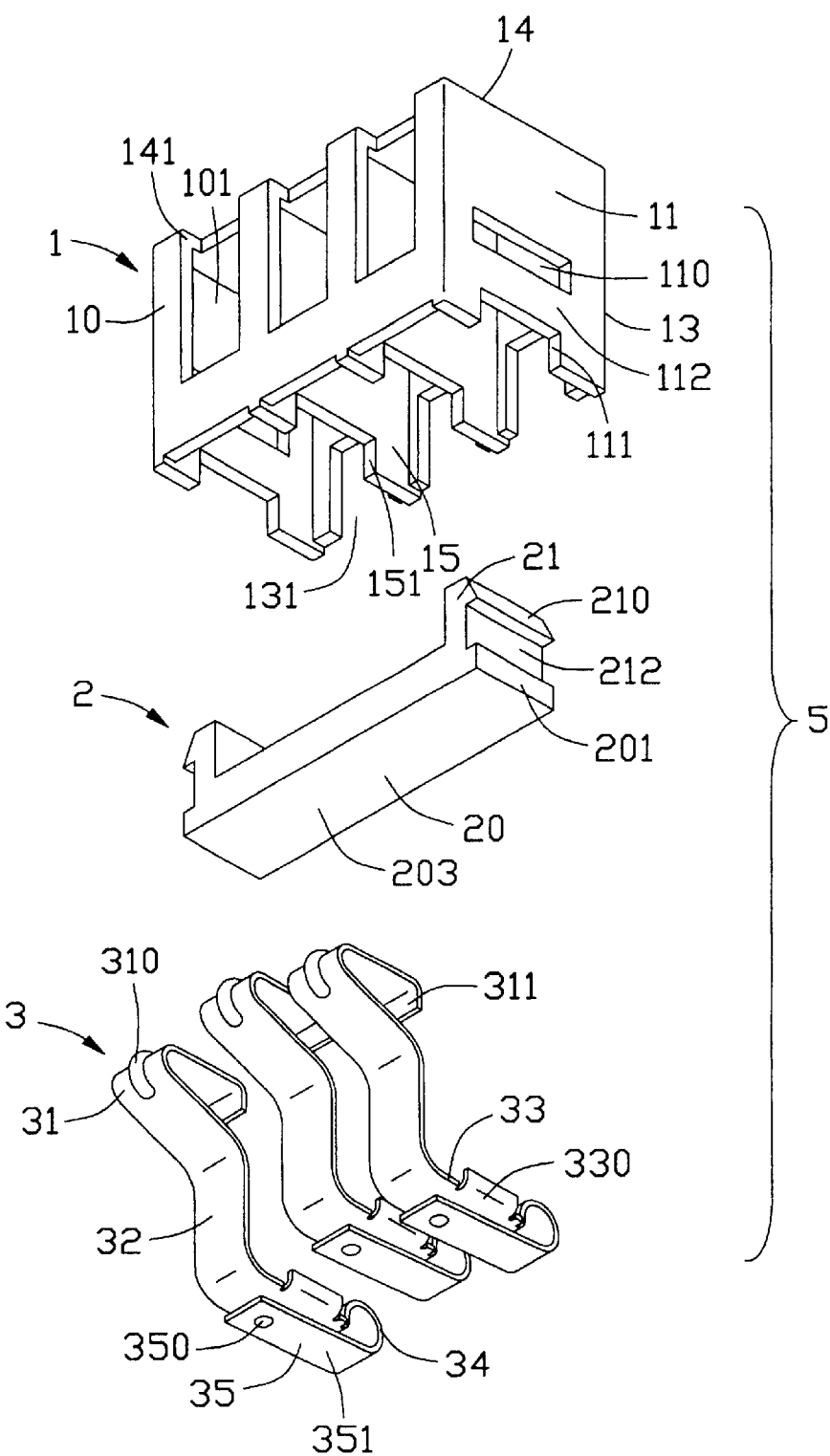
FIG. 1 is an exploded view of a battery connector according to the present invention.

Referring to FIG. 1, a battery connector 5 according to the present invention has an insulative housing 1, an elongate insulative insert 2 and a plurality of terminals 3 insert molded with the insert 2. In order to have a clear view, the terminals 3 are separated from the insert 2. The housing 1 has a front wall 10, a rear wall 13, a top wall 14, two side walls 11 and two inner walls 15. The side walls 11 have bottom edges which are at a level lower than those of the front wall 10 and the rear wall 13. A plurality of passageways 101 is defined in the. insulative housing 1 for receiving the terminals 3. A plurality of slots 141 is defined in the top wall 14 and communicates with corresponding passageways 101. A plurality of grooves 131 is defined in a lower portion of the rear wall 13. Each of the inner walls 15 and the side walls 11 defines a cutout 111, 151 in a lower portion thereof. An opening 16 is thus defined in a bottom of the housing 1 transecting the passageways 101. Each side wall 11 further defines a hole 110 above the cutout 111. A rib 112 separates the hole 110 from the cutout 111.

The insert 2 has a flat body portion 20 for being received in the opening 16 and a pair of lock portions 21 formed respectively on opposite ends 201 of the body portion 20. Each lock portion 21 has a clasp 210 for engaging with the hole 110 of a corresponding side wall 11 and a recess 212 defined below the clasp 210 for receiving a corresponding rib 112 of the housing 1.

Figure 5:
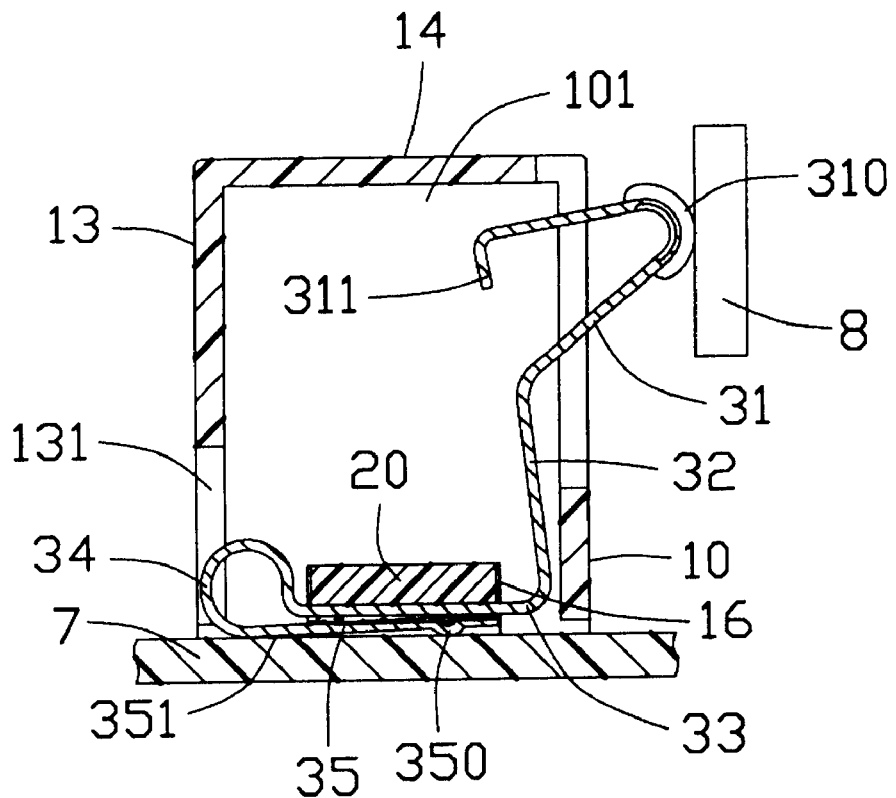
FIG. 5 is a cross-sectional view of the battery connector of FIG. 3 with a battery and a printed circuit board (PCB) assembled thereto.
Figure 6:
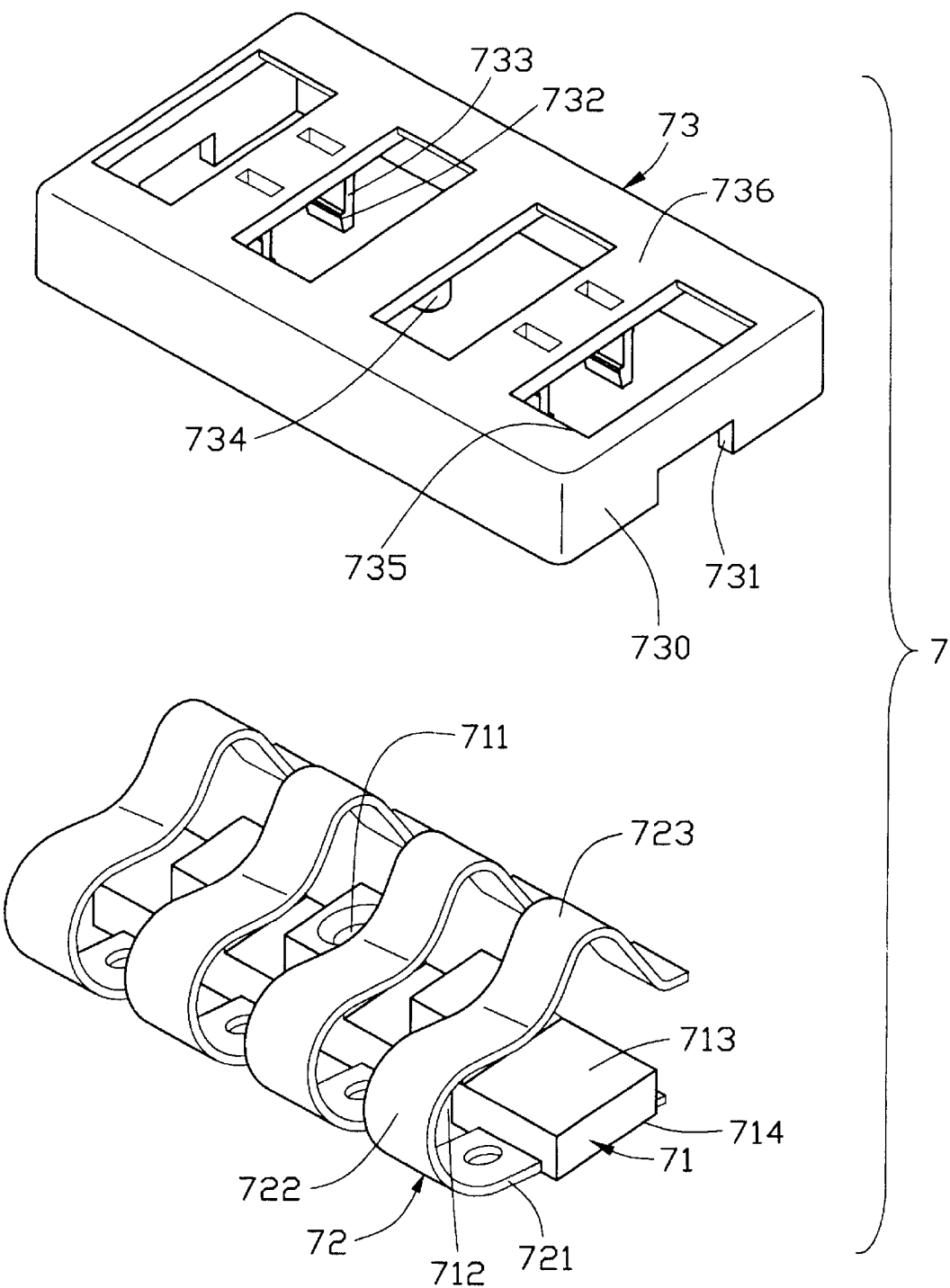
FIG. 6 is an exploded view of a conventional battery connector.

Each of the terminals 3 has a contacting portion 31, a first spring portion 32, a connection portion 33, a second spring portion 34 and a mounting portion 35. The contacting portion 31 has a convexity 310 and a downwardly bent free end portion 311. The convexity 310 ensures a reliable contact between the terminal 3 and a contact face of a battery 8 (FIG. 5). A pair of tabs 330 is formed on opposite edges of the connection portion 33 for engaging with the insert 2 when the terminals 3 are insert molded therewith, thereby ensuring a secure combination of the insert 2 and the terminals 3. The second spring portion 34 for being received in the groove 131 of the housing 1 is shaped generally having a profile of a three-fourth circle whereby the second spring portion 34 can provide the mounting portion 35 with sufficiently large resilience to ensure the mounting portion 35 to have a reliable engagement with a printed circuit board 7 (PCB, FIG. 5) on which the connector 5 is mounted. A bulge 350 is formed on a bottom surface 351 of the mounting portion 35 to contact with a corresponding circuit trace on the PCB 7.

Figure 2:
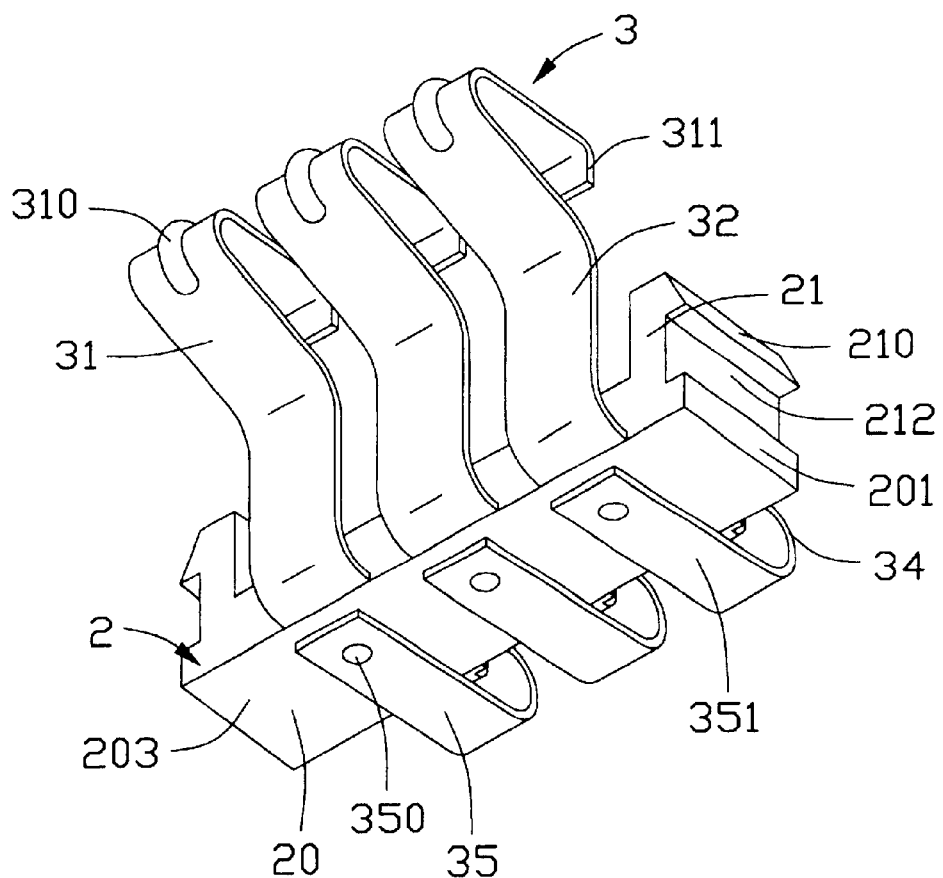
FIG. 2 is an assembled view of terminals and an insert of the battery connector of FIG. 1.

Referring to FIG. 2, the terminals 3 are inserted molded with the insulative insert 2. The connection portions 33 of the terminals 3 are embedded in the body portion 20 of the insert 2. The tabs 330 are bite into the body portion 20, so that the terminals 3 are secured with the insert 2.

Figures 3, 4:
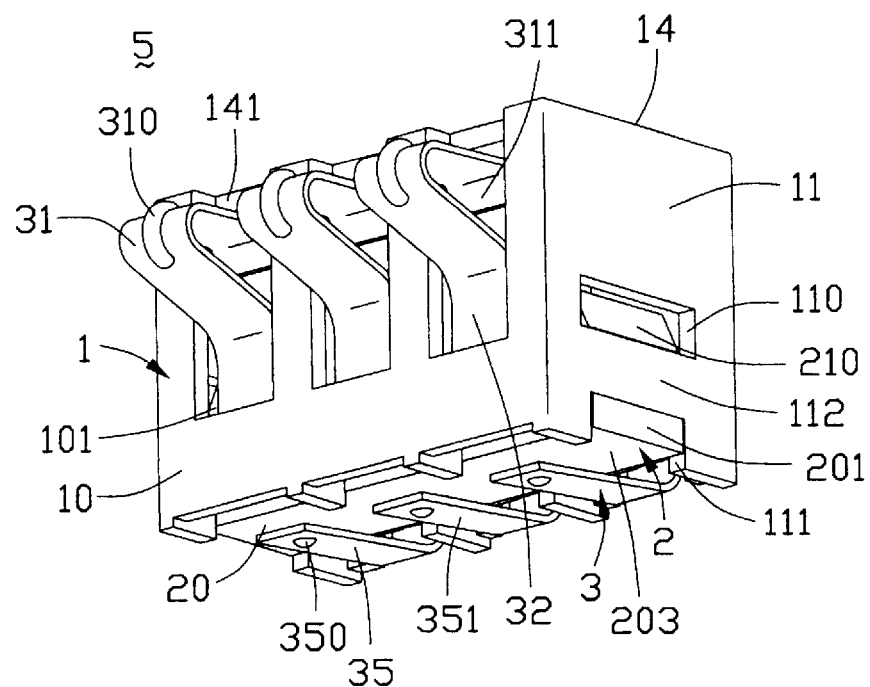
FIG. 3 is an assembled view of the battery connector of FIG. 1.
FIG. 4 is a cross-sectional view of the battery connector of FIG. 3.

Referring to FIGS. 3 and 4, in assembly, the terminals 3 are received respectively in the passageways 101. The contacting portion 31 of each terminal 3 projects substantially beyond the front wall 10 with the free end portion 311 thereof projecting into the housing 1. The slots 141 defined in the top wall 14 prevent the convexities 310 of the terminals 3 from interfering with the top wall 14 when an external force is exerted on the terminals 3 for electrically connecting the connector 5 with a battery 8. The body portion 20 of the insert 2 is received in the opening 16 of the housing 1. Protrusions 201 of the insert 2 located immediately below the recesses 212 are received in the cutouts 111 respectively. The bottom surface 203 of the body portion 20 is at a level higher than the bottom edges of the inner walls 15 and the side walls 11 after the insert 2 is assembled to the housing 1. The clasps 210 of the lock portions 21 engage with the holes 110 and the recesses 212 receive the ribs 112 of the side walls 11, thereby securing the insert 2 to the housing 1 firmly. The terminals 3 are retained in the housing 1 and a resilient and reliable connection is formed between the convexities 310 of the contacting portions 31 of the terminals 3 and contact face (not labeled) of the battery 8 (FIG. 5). The second spring portion 34 of each terminal 3 projects into a corresponding groove 131 of the rear wall 13. The mounting portions 35 are located below the body portion 20 and project downwardly beyond the housing 1, whereby a solderless and reliable connection between the bulges 350 of the mounting portions 35 and the circuit traces of the PCB can be established due to the resiliency of the second spring portions 34.

Referring to FIG. 5, the mounting portions 35 of the terminals 3 extend upwardly and into corresponding passageways 101 of the housing 1 after the battery connector 5 is mounted on the PCB 7. The first spring portions 32 of the terminals 3 incline inwardly and the convexities 310 of the terminals 3 engage with the contact face of the battery 8 after the battery 8 is assembled to the battery connector 5.

It is to be understood, however, that even though numerous, characteristics and advantages of the present invention have been set forth in the foregoing description, together with details of the structure and function of the invention, the disclosed is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector adapted for mounting on a printed circuit board (PCB) and connecting with an electrical device, comprising:

an insulative housing having a plurality of passageways and two side walls;

an insulative insert having a body portion with two opposite ends securely engaging with the side walls; and a plurality of terminals insert molded with the insert, each terminal being received in a corresponding passageway, having a contacting portion projecting forwardly beyond a front wall of the housing adapted for connecting with the electrical device, and a moveable mounting portion extending beyond a bottom face of the housing; wherein each of the opposite ends of the insert has a lock portion, the lock portion having a clasp, a recess below the clasp and a protrusion below the recess.

2. The electrical connector of claim 1, wherein the housing has a top wall defining a plurality of slots communicating with corresponding passageways of the housing.

3. The electrical connector of claim 1, wherein the housing has a rear wall defining a plurality of grooves communicating with corresponding passageways, the terminals having spring portions for providing the mounting portions with resiliency, the spring portions being received in the grooves.

4. The electrical connector of claim 1, wherein the housing defines an opening transecting the passageways of the housing and receiving the body portion of the insert.

5. The electrical connector of claim 3, wherein the spring portions of the terminals each are shaped generally having a profile of a three-fourth circle.

6. The electrical connector of claim 1, wherein a bottom surface of the body portion of the insert is at a level higher than bottom edges of the side walls.

7. The electrical connector of claim 1, wherein the bottom edges of the side walls are higher than bottom edges of the front wall and a rear wall of the housing.

8. The electrical connector of claim 1, wherein each side wall of the housing defines a hole receiving a corresponding clasp, a rib fitted in a corresponding recess and a cutout receiving a corresponding protrusion.

9. The electrical connector of claim 1, wherein the insulative housing further has an inner wall, the inner wall defining a cutout aligned with the cutouts of the side walls.

10. The electrical connector of claim 2, wherein a bottom edge of the inner wall is coplanar with bottom edges of the side walls.

11. An electrical connector for use with a printed circuit board and a battery, comprising:

An insulative housing defining a plurality of passageways respectively extending through a front wall of the housing; and an insulative insert associated with a plurality of terminals assembled into the housing; wherein each of said terminals includes a connection portion embedded within the insert, a contacting portion connected to the connection portion via a first spring portion and extending out of the front wall for engagement with the battery, and a mounting portion located below the insert for engagement with the printed circuit board and connected to the connection portion via a second spring portion; wherein each of the opposite ends of the insert has a lock portion, the lock portion having a clasp a recess below the clasp and a protrusion below the recess.

12. The connector for claim 11, wherein the first spring portion vertically extends between the connection portion and the contacting portion.

13. The connector of claim 11, wherein a plurality of grooves formed in a rear wall of the housing in alignment with the corresponding passageways, respectively, and the second spring portion extends curvedly around the corresponding groove.

* * * * *